Jan. 10, 1933.  D. D. CHASE  1,894,084

SYSTEM OF DISTRIBUTION

Filed April 1, 1931

Inventor:
Delmar D. Chase,
by Charles E. Tullar
His Attorney.

Patented Jan. 10, 1933

1,894,084

UNITED STATES PATENT OFFICE

DELMAR D. CHASE, OF SCOTIA, NEW YORK, ASSIGNOR TO GENERAL ELECTRIC COMPANY, A CORPORATION OF NEW YORK

SYSTEM OF DISTRIBUTION

Application filed April 1, 1931. Serial No. 526,992.

My invention relates to systems of distribution and more particularly to systems of distribution supplying single-phase power from a polyphase distribution circuit.

In view of the increased demand for single-phase power for many alternating current railway electrifications, the attention of engineers has been directed to a more intensive study of this problem. Single phase generating sources may be used, but such systems result in an uneconomical condition in most cases. Studies have also shown that it is not sound practice to supply single-phase power from one phase of a three-phase system unless the single-phase power is only a very small portion of the total load on the system without the employment of some means to balance the current in the three phases. Static as well as rotary phase balancing means have been suggested or employed heretofore. The rotary phase balancers are classified as the shunt type and the series type. The shunt type has shown satisfactory operation in practice but involves in effect two machines, whereas the series type is simpler in principle and operation but does not possess the characteristic of balancing loads on all phases of the polyphase system.

It is an object of my invention to provide an improved system of distribution for supplying single-phase power from a polyphase system without unduly unbalancing the polyphase system.

It is a further object of my invention to provide an improved rotary phase balancing device comprising a single-unit multiple-winding dynamo-electric machine.

In accordance with my invention I provide a dynamo-electric machine having separately insulated inductively related windings on the same stator core in which one winding acts as a motor winding and the other winding as a generator winding so that the machine functions as a phase balancer between a polyphase system and a single-phase system by transferring a substantial portion of the single-phase load of the generator winding back to the polyphase system as a polyphase load.

Figure 1:
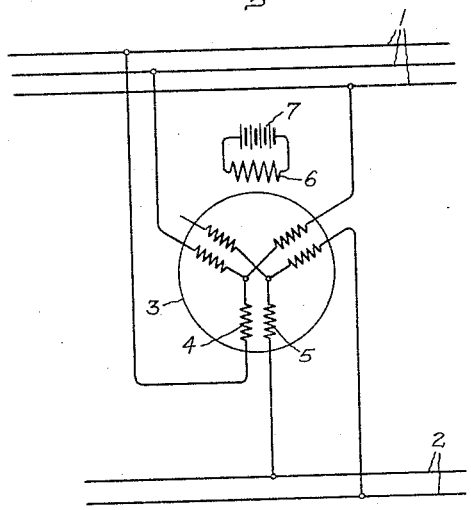
Figure 2:
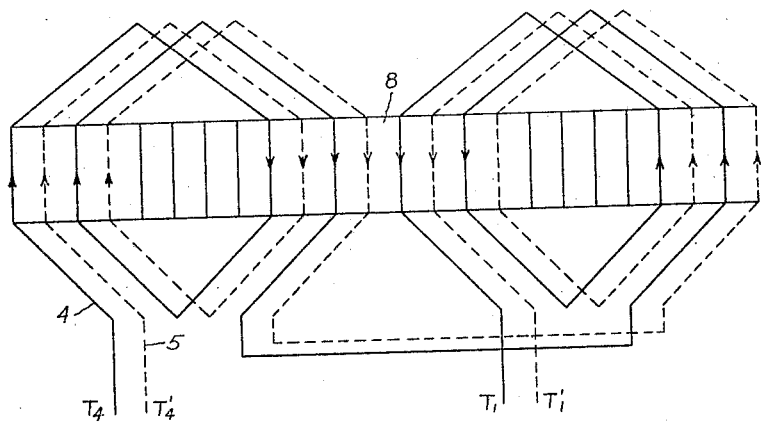

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawing. Fig. 1 is a diagrammatic representation of one embodiment of my invention and Fig. 2 is a diagrammatic development on a plane surface of a portion of the type of winding that may be employed for the dynamo-electric machine of Fig. 1.

Referring to Fig. 1 of the drawing, 1 indicates the conductors of a polyphase supply circuit illustrated as a three-phase circuit, and 2 indicates the conductors of a single-phase load circuit. These circuits are interconnected by a double winding dynamo-electric machine 3 having two separately insulated stator windings 4 and 5. It is of course understood that any suitable form of cooperating secondary or field structure may be employed and this is represented by field winding 6 which is connected to be energized by a suitable source of excitation diagrammatically illustrated as a battery 7. The winding 4, as shown, is a three-phase winding and is connected to the three-phase supply circuit 1, and the winding 5, as shown, is also a three-phase winding, but in the illustrated embodiment the connections are made to circuit 2 from only two of the phase windings so as to provide single-phase power. It will be obvious to those skilled in the art that each phase winding of winding 5, however, may be connected to supply single-phase power to independent single-phase circuits or one phase winding may be omitted or left disconnected as shown in the drawing if only one single phase load circuit is to be energized without departing from my invention in its broader aspects.

While my invention in its broader aspects contemplates the use of known types of multiple-circuit dynamo-electric machine windings such as the standard multiple-circuit type of winding having alternate poles connected in series, I find that the most suitable winding is of the type described and claimed in my application for United States Letters Patent, Serial No. 276,467, filed May 9, 1928, and patented July 21, 1931, No. 1,815,832, or the type of winding described and claimed in the application for United States Letters Patent of Philip L. Alger, Serial No. 410,209, filed November 27, 1929, both of which are assigned to the assignee of the present application.

The type of winding described in my aforementioned application consists of a plurality of separate circuits for each phase interleaved in different slots around the complete periphery of the stator core. The lead of the coil sides of different circuits is alternated in different phase belts in order to obtain a predetermined relation between the magnitude and phase of the voltages of circuits of corresponding phase, which relation is ordinarily an equal and in-phase relation of the voltages of the circuits of a given phase for interconnecting bus sections in a generating station. In carrying out my present invention, it will not be necessary in most cases to alternate the coil sides to obtain an equal and in-phase relation between the voltages of the two windings, although there will be no harm in so doing, since the respective windings are connected to different circuits requiring no particular phase or voltage relation therebetween.

In Fig. 2 of the drawing, I have illustrated one phase of windings 4 and 5 respectively in a diagrammatic development on a plane surface for a two-layer lap winding, two pole, three-phase machine which is in accordance with my invention described and claimed in my aforementioned application. In the drawing, 8 represents the core of the armature winding which in practice would ordinarily be the stator and which would be constructed like the stator of a standard alternating current dynamo-electric machine consisting of a slotted laminated core. There are in this particular instance 24 slots with fractional pitch coils of ⅔ pitch. The winding 4 is shown in full lines and the free and neutral terminals are designated $T_1$ and $T_4$ respectively. Similarly the winding 5 is shown by a broken line and the free and neutral terminals are designated $T_1$ and $T_4$ respectively. It will be noted that the respective coil sides of the two windings are arranged in alternate slots and both windings will be distributed around the complete periphery of the stator core when all the phase circuits are inserted in accordance with the illustrated arrangement.

It is preferable in the design of dynamo-electric machine 3 to use a laminated field structure for the rotor, either of the salient pole type with an armortisseur winding for starting purposes or of the round rotor type of construction as used in small turbine generator sets.

The machine 3 in operation functions to transfer the single-phase load of one winding back to the three-phase system as a three-phase load. In any single-phase load there is a backward rotating current, the negative phase sequence current, which is equal to the forward rotating current, the positive phase sequence current, when a single-phase load is drawn from a three-phase system. When utilizing the phase balancer in accordance with my invention, the negative phase sequence current transmitted back to the three-phase system is determined by the relative reactances of the balancer and the three-phase system and is proportional to the ratio of the mutual inductance of the balancer windings and the sum of the mutual inductance of the windings plus the self-inductance of the three-phase winding plus the reactance of the three-phase system back of the balancer. From this it is obvious that the single phase disturbance transmitted back on the polyphase system by the double winding phase balancer is much smaller than for a single-phase load connected directly to the three-phase system. This is due to the fact that in the system arranged in accordance with my invention the major portion of slot leakage and tooth tip leakage of the double winding machine is effective as part of the impedance of the polyphase system, whereas the major portion of the end leakage reactance of the double winding machine is the effective impedance of the dynamo-electric machine with respect to the negative phase sequence currents. Thus by making a dynamo-electric machine with a high slot leakage reactance in comparison to the end leakage reactance most of the single phase negative phase sequence current is absorbed by the dynamo-electric machine itself. Although all of the negative phase sequence current is not absorbed, the balancer is able to absorb such an amount that on large systems the single-phase component carried back on the system will not unduly unbalance the polyphase system.

Each winding of the stator must carry the full single-phase kv. a., but part of both positive and negative phase sequence currents are transmitted from one winding to the other as a transformer and, therefore, the field does not need to be designed corresponding to the double kv. a. of the stator. However, the field requirements are much less than for a normal machine of the rating of one stator winding and therefore, although there will be rotor heating due to the double frequency currents induced therein, the size of the entire machine with the elimination of a separate motor unit will be only about 20 per cent greater than that of a single-phase generator of a conventional three-phase motor, single-phase generator motor-generator set.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is,—

1. In a system of distribution, a polyphase supply circuit, a single phase load circuit, an alternating current dynamo-electric machine having two separately insulated windings on the same stator core for interconnecting said circuits, one of said windings being connected to said supply circuit and the other being connected to said load circuit, the inductive relation between said windings being such that the mutual inductance thereof shall be substantially less than the self-inductance of the winding connected to said polyphase circuit whereby a substantial portion of the single phase load shall be imposed upon the polyphase system as a polyphase load.

2. In a system of distribution, a polyphase circuit, a single phase circuit, an alternating current dynamo-electric machine having two separately insulated windings on the same stator core for interconnecting said circuits to transfer power from said polyphase circuit to said single phase circuit, said windings being arranged to have a slot leakage reactance substantially in excess of the end leakage reactance whereby a substantial portion of negative phase sequence current is absorbed by said machine.

3. In a system of distribution, a polyphase supply circuit, a load circuit, an alternating current dynamo-electric machine having two separately insulated windings with the coil sides of the respective windings interleaved in different slots around the periphery of the stator core, one of said windings being a polyphase winding equal in number of phases to said polyphase supply circuit and connected thereto, the other of said windings being connected to furnish single phase power to said load circuit.

In witness whereof, I have hereunto set my hand.

DELMAR D. CHASE.

Certificate of Correction

Patent No. 1,894,084. January 10, 1933.

DELMAR D. CHASE

It is hereby certified that error appears in the printed specification of the above-numbered patent requiring correction as follows: Page 2, line 51, for "$T_1$ and $T_4$" read $T_1'$ *and* $T_4'$; and that the said Letters Patent should be read with this correction therein that the same may conform to the record of the case in the Patent Office.

Signed and sealed this 21st day of February, A. D. 1933.

[SEAL.] M. J. MOORE,
*Acting Commissioner of Patents.*